Figure 1:
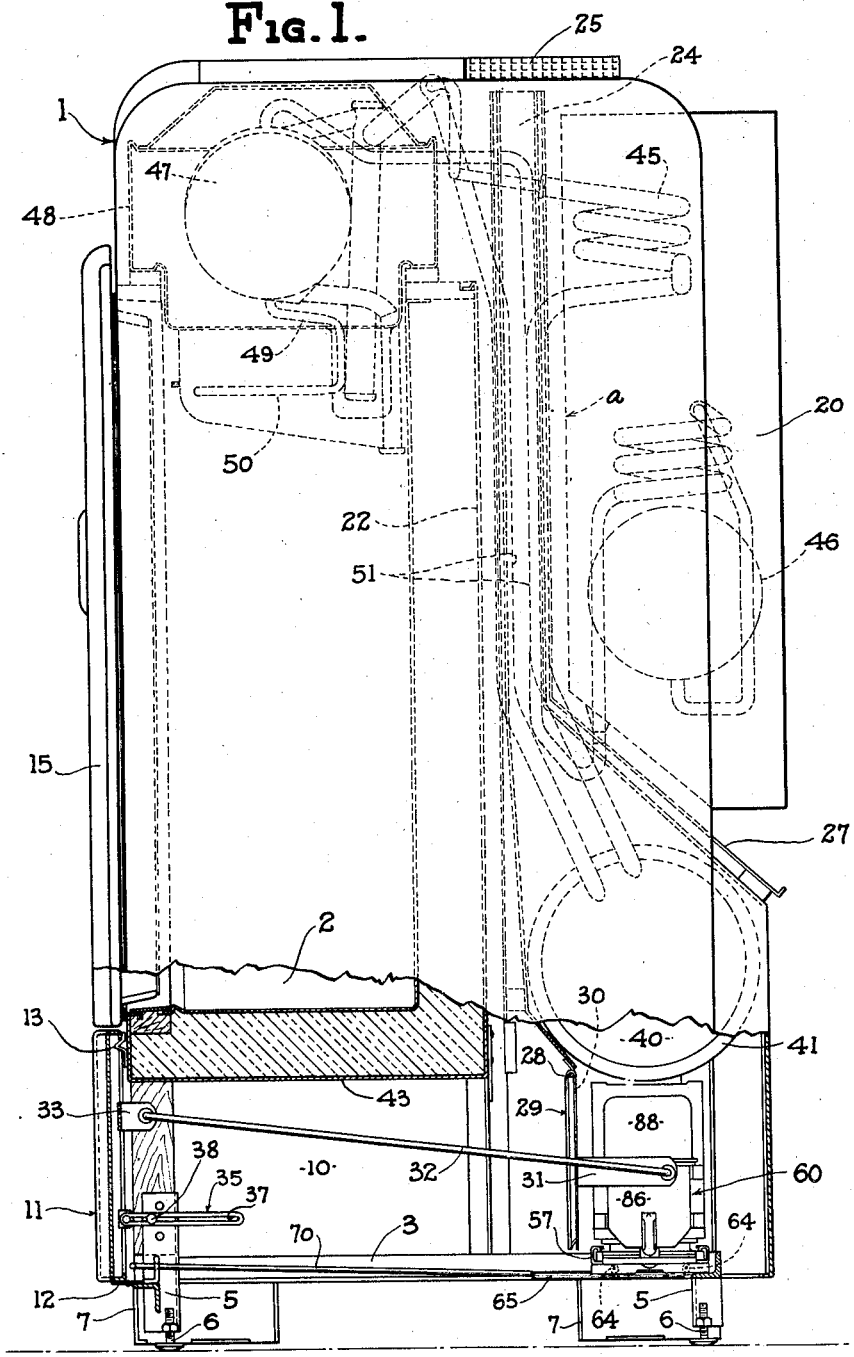

Aug. 20, 1940.   L. S. CHADWICK   2,212,364
LIQUID FUEL FIRED ABSORPTION REFRIGERATOR
Filed Aug. 12, 1938   5 Sheets-Sheet 1

INVENTOR.
LEE S. CHADWICK
BY Hull, Brock & West
ATTORNEYS.

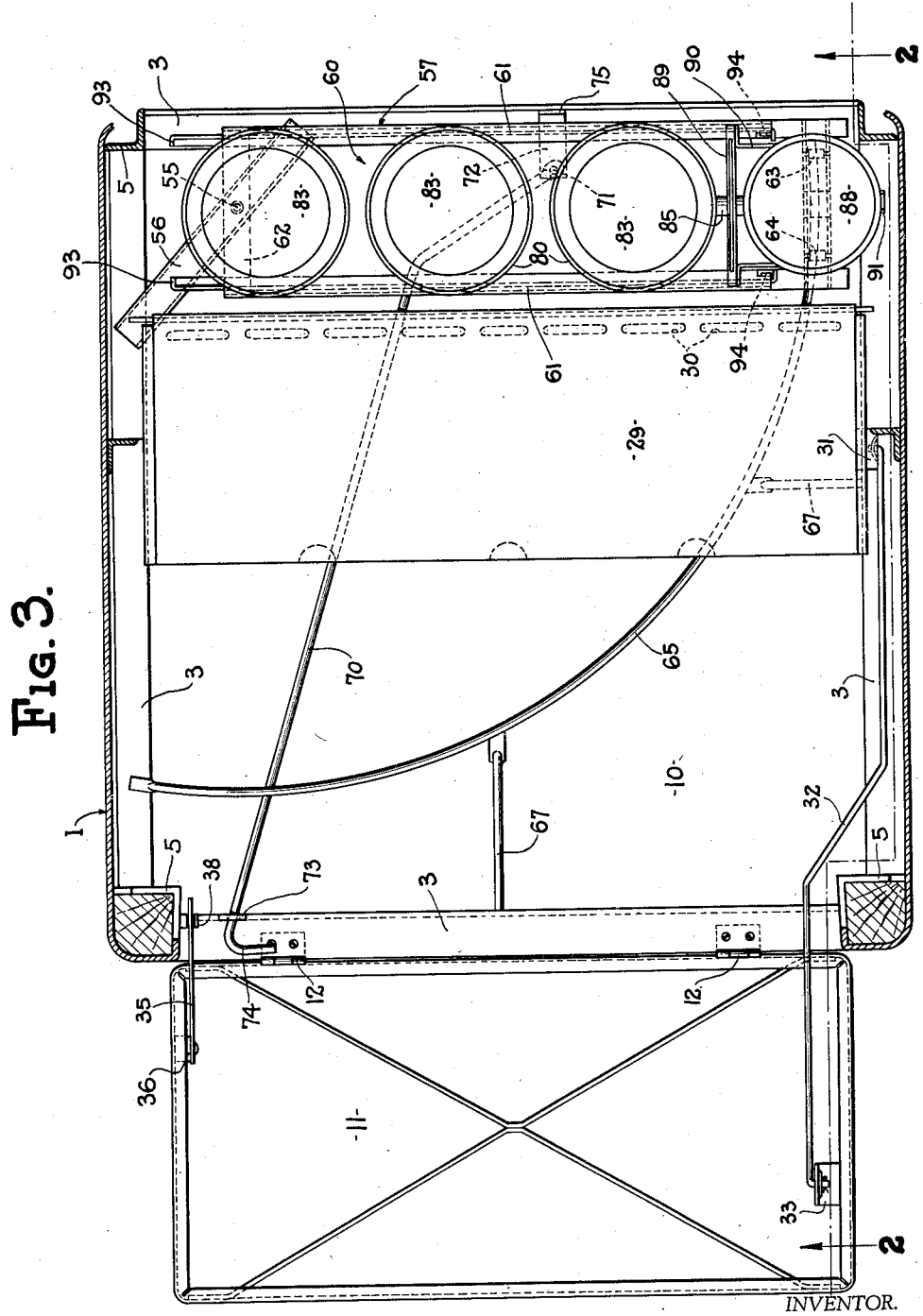

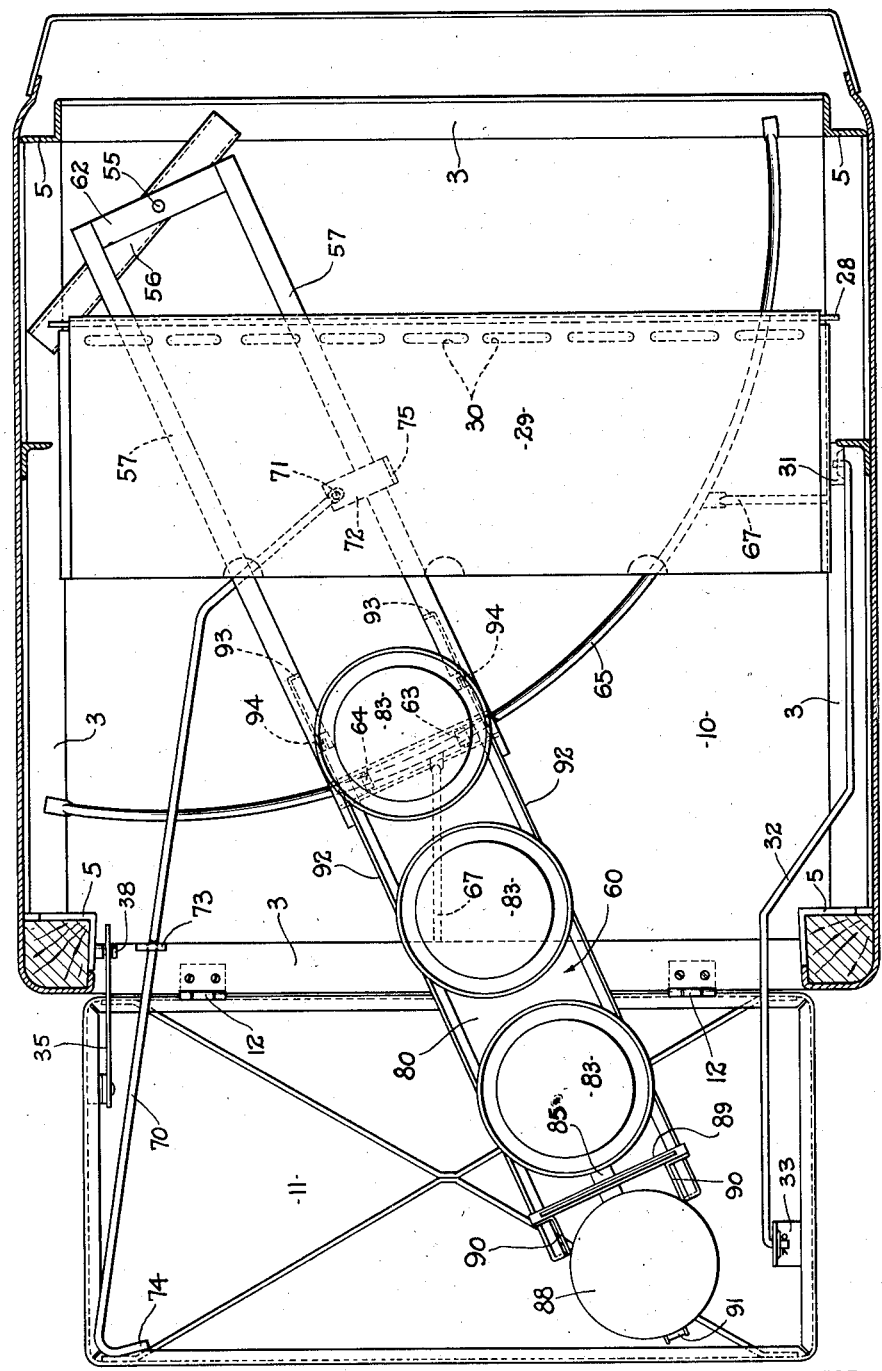

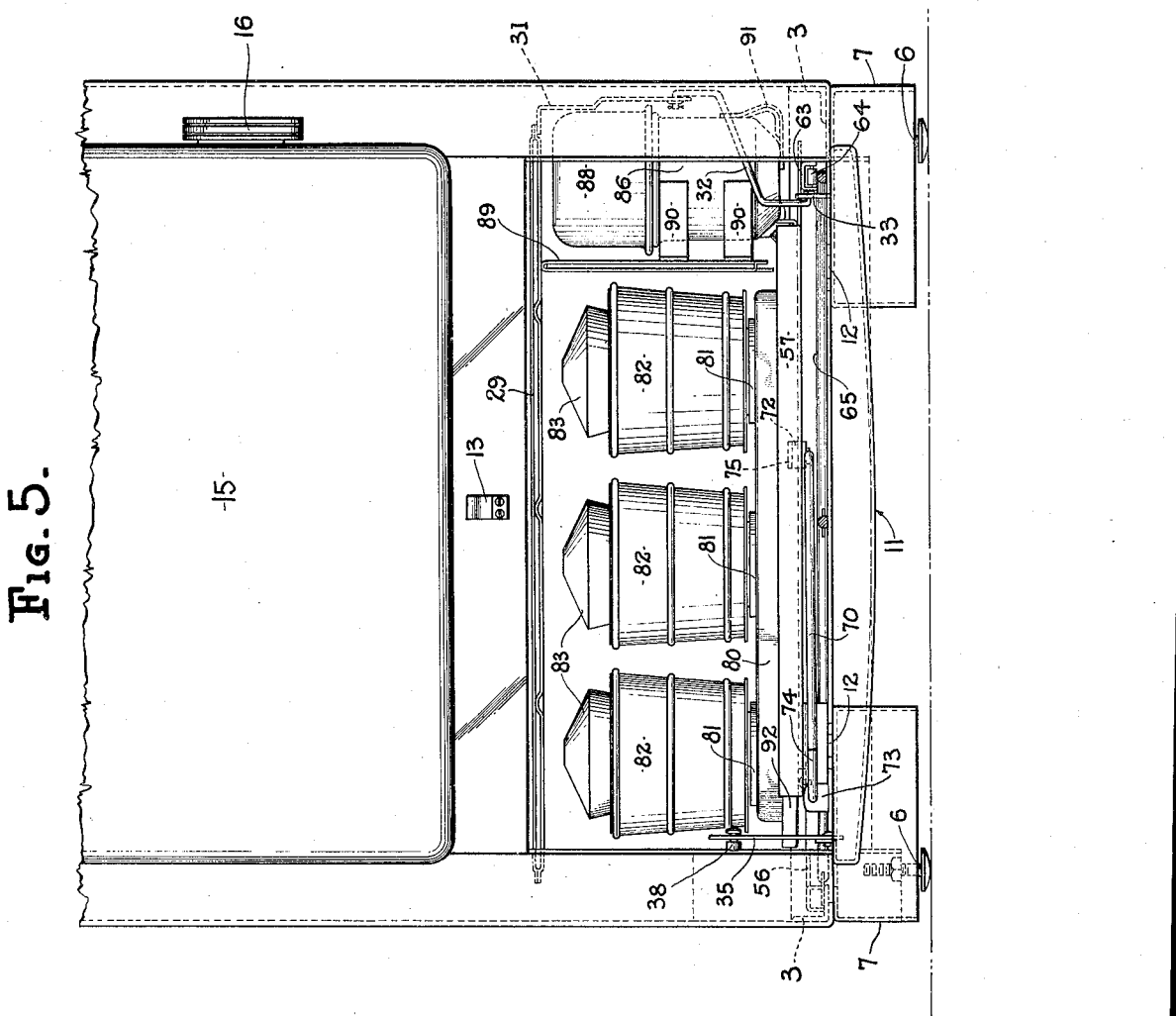

Patented Aug. 20, 1940

2,212,364

UNITED STATES PATENT OFFICE 2,212,364

LIQUID FUEL FIRED ABSORPTION REFRIGERATOR

Lee S. Chadwick, Shaker Heights, Ohio, assignor to Perfection Stove Company, Cleveland, Ohio, a corporation of Ohio Application August 12, 1938, Serial No. 224,529

16 Claims. (Cl. 62—5)

This invention relates to improvements in absorption refrigerating machines of the class in which a combustion device, particularly a liquid fuel burner, is used for heating the generator.

The broad purpose of the invention is the production of a refrigerating machine comprising a cabinet that houses an insulated refrigeration space, a compartment therebelow, and a vertical flue alongside of or to the rear of said space that merges at its lower end with said compartment, and wherein at the junction of the flue and compartment the combustion device or liquid fuel burner unit (with the generator of the refrigeration system thereabove) is located so that said device or unit is accessible through the compartment; and to provide a shield or partition for protecting said compartment, and consequently the bottom wall of the refrigeration space, from the heat of the combustion device or burner unit, the same being hingedly or otherwise movably supported within the cabinet so that it may be swung up or shifted to a position out of the way when it is desired to reach the device or unit.

Another object is to movably support the combustion device or burner unit so that, when said shield or partition is swung or shifted out of the way, the device or unit may be moved into the compartment where it may be readily reached for lighting or other purposes. The burner unit includes a liquid fuel reservoir desirably of a capacity to accommodate only enough fuel to sustain a heating phase of maximum duration of a cycle of operation of the intermittent absorption refrigerating system, and a further object of the invention is to provide for a partial or complete withdrawal of the burner unit from the compartment to facilitate replenishment of the fuel supply and for cleaning purposes.

In the present preferred embodiment of the invention, a door is arranged below the usual door of the refrigeration space for normally closing the open side or front of the compartment through which access is had to the combustion device or burner unit, and the first mentioned door is hinged to the cabinet desirably at its lower edge so that it may be swung down to a horizontal position, and a further object is to provide operative connections between said door and the aforesaid shield or partition through which, when the door is opened, said shield or partition will be swung or shifted out of the way so that the combustion device or burner unit is immediately and readily accessible.

A more limited object is to provide a track by which the combustion device or burner unit is slidably supported and which track is adapted to be swung into the compartment to a position affording convenient reach of the device or unit, the construction permitting forward sliding or projection of the device or unit and desirably allowing actual withdrawal thereof from the track through the open side or front of the compartment.

A further object is to construct the aforesaid shield or partition of spaced plates or walls to provide therebetween a space vented at top and bottom and through which air may circulate, the vent at the top desirably discharging into the flue, such a construction greatly enhancing the insulating capacity of the shield or partition.

A still further object is to locate the condenser tank, with its enclosed elements of the refrigerating system, to the rear of the aforesaid flue above the portion occupied by the generator and combustion device or burner unit, and to construct the flue with double front and rear walls that are desirably spaced from the rear wall of the refrigerating space and the forwardly disposed wall of the condenser tank, the double construction of the walls providing ducts through which air may freely circulate.

By reason of the general arrangement set forth, with the condenser tank situated to the rear of the flue, and with the aforesaid compartment below the refrigeration space, undue height of cabinet is avoided, and said refrigeration space is elevated a convenient distance above the floor; occupies substantially the full width of the cabinet; and is shallow enough to facilitate the placement of dishes or other objects in and their removal from said space.

Figure 2:
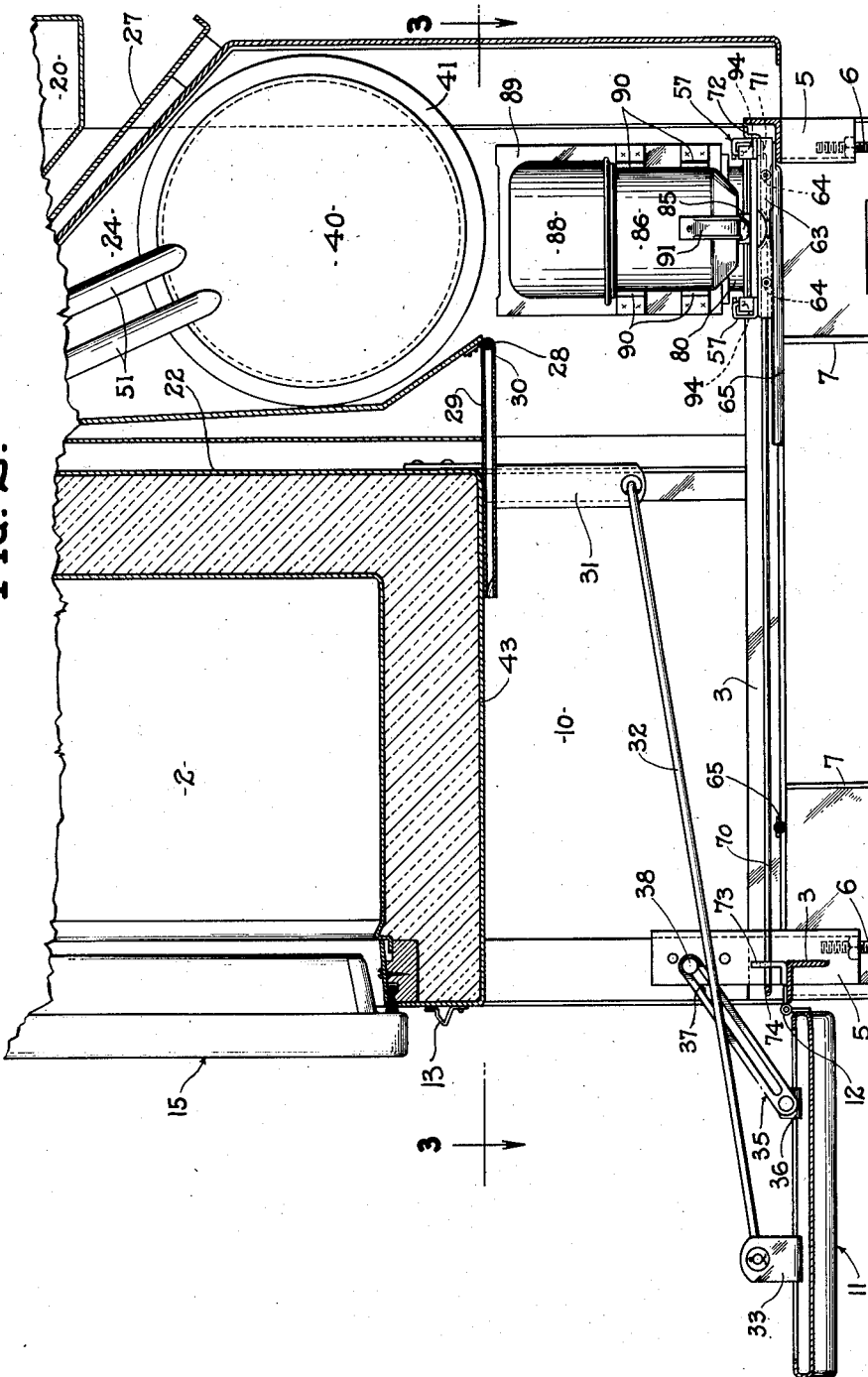

The foregoing objects and advantages, with others hereinafter appearing, are attained in the embodiment of the invention illustrated in the accompanying drawings wherein Fig. 1 is a side elevation, partly in section, of my improved refrigerating machine; Fig. 2 is a sectional side elevation of the lower portion of the machine on a scale considerably enlarged over that of Fig. 1, the plane of section being immediately inside the near wall of the cabinet as indicated by the line 2—2 of Fig. 3; Fig. 3 is a sectional plan on the line 3—3 of Fig. 2; Fig. 4 is a view similar to Fig. 3 showing the track of the combustion device or burner unit swung into the compartment below the refrigeration space and with the device or unit slid forward so as to be partly outside the compartment and over the door thereof, and Fig. 5 is a front elevation of the lower portion of the machine with the door of the compartment open and the shield or partition swung upwardly by reason of its operative connection with the door, revealing the combustion device or burner unit occupying its normal position in the bottom of the flue.

The cabinet, designated generally by the reference numeral 1, may follow prevailing practice as to the character of its construction; and enclosed within its front portion, in spaced relation to its top and bottom, is an insulated refrigeration space 2. The cabinet incorporates a base frame 3, made of angle iron, and the structure is supported a suitable distance above the floor by legs 5, the latter incorporating adjusting screws 6 by which the cabinet may be leveled or irregularities in the floor compensated for; and to enhance the appearance of the structure the legs 5 are concealed from outward view by false legs 7 in the nature of sheet metal shells suitably attached to the base frame 3.

Below the insulated refrigeration space 2 is a compartment 10 whose open front is normally closed by a door 11 that is hinged at its lower edge, as indicated at 12, to the front member of the base frame 3. The door 11 is retained in closed position by a latch 13, preferably frictional, and a door 15 of the usual insulated kind closes the front of the refrigeration space 2 and is hingedly connected along one of its edges to the front of the cabinet, one of the hinges by which such connection is made being shown at 16 in Fig. 5.

Built into the rear upper portion of the cabinet is a rectangular condenser tank 20 (Fig. 1). The front wall of the tank, indicated by the dotted line a, is spaced a substantial distance to the rear of the back wall 22 of the refrigeration space 2, and disposed between and in spaced relation to said walls is a flue designated generally by the reference numeral 24, arranged to discharge into the atmosphere through an opening in the top of the cabinet covered by a grill 25. The flue is desirably rectangular in plan and extends in a lateral direction to points adjacent the side walls of the cabinet, and the walls of the flue, especially the front and rear walls, are of double construction, as clearly indicated partly in dotted lines and partly in full lines in Fig. 1, so that a duct is provided between the two plates or elements of each of the double walls through which air may circulate. As will be observed from Figs. 1 and 2, the front and rear walls of the flue 24 diverge toward their lower ends to produce an enlargement of the flue, the effect being accomplished in the present construction by inclining the rear wall downwardly and rearwardly, as shown at 27, the adjacent corner of the condenser tank 20 being shaped to accommodate the inclination of said wall. To the lower edge of the inner plate or element of the front wall of the flue is hingedly connected at 28, a shield or partition 29, desirably of double wall construction, and the space enclosed thereby is open adjacent the free edge of the shield or partition, and is vented, through slots 30, adjacent the hinged edge thereof, desirably to the interior of the flue. An arm 31 is rigidly connected to the right hand end of the shield or partition, as the parts are viewed from the front (as in Fig. 5), and to the free end of said arm is pivoted the rear end of an element or rod 32. The forward end of such rod or element is similarly connected to a lug 33 that extends inwardly from the corresponding end of the door 11. The door 11 is sustained, when open, in a substantially horizontal position, by a link 35 that is pivoted at one end to a lug 36 on the end of the door 11 opposite the lug 33 and has a longitudinal slot 37 that embraces a headed pin 38 on an adjacent part of the cabinet frame.

It follows from the construction just described that the shield or partition 29 is swung between effective, vertical position and ineffective, horizontal position when the door 11 is swung between open and closed positions.

The refrigerating system of intercommunicating vessels and conduits employed in my present machine may be the same in essential respects as that disclosed and claimed in Patent No. 2,062,921, issued December 1, 1936. The refrigerating system, per se, indicated in dotted lines in Fig. 1, constitutes no part of the present invention, wherefore a detailed description is deemed unnecessary, further than to explain that the generator 40 consists of a cylindrical vessel, surrounded by heat abstracting vanes 41, and it is situated within the enlarged lower portion of the flue 24, desirably above the plane of the under surface of the bottom wall 43 of the refrigeration space 2. Circulating and storage elements 45 and 46, constituting the dehydrator and condenser, respectively, are enclosed in the condenser tank 20, while the receiver 47 that forms a part of the evaporator end of the system is located adjacent the top portion of the cabinet, desirably within an evaporator tank 48. The receiver 47 communicates, through conduits designated generally by the numeral 49, with the evaporator 50 that is located in the top of the refrigeration space 2. The generator-absorber and receiver-evaporator ends of the system are communicatively connected together for the performance of a refrigerating cycle by conduits 51.

Turning now to the combustion device or burner unit and related parts: Pivotally connected at 55 to a diagonal member 56 that is secured to and supported by the rear left hand corner of the base frame 3, is one end of a slideway or track 57 for movably or slidably supporting the combustion device or burner unit designated generally by the reference numeral 60. The slideway or track is substantially the same as the corresponding element of Patent No. 2,014,465, granted September 17, 1935 on a joint invention of Marc Resek and myself, and the same includes opposed inwardly facing channels 61 that are connected together in parallel relation to each other by cross members 62 and 63, the former being the element of the slideway or track that is pivoted to the diagonal member 56. The cross member 63 is located adjacent the free end of the track, and is in the nature of a downwardly facing channel between the side flanges of which are rotatably supported rollers 64 (Figs. 2, 3 and 5). These rollers bear on an arcuate rail 65, shown as circular in cross section, that is supported by the base frame 3. The ends of the rail are flattened and spot welded or otherwise secured to the horizontal flange of the base frame 3, and intermediate its ends the rail 65 is connected to the base frame by braces 67.

Means for swinging the slideway or track 57 on its pivot 55 is provided by an operating rod 70 the rear end of which is pivotally connected at 71 to a lug 72 on the slideway or track, and the forward end portion of which is guided through an apertured lug 73 that rises from the base frame 3 adjacent the front left hand corner thereof, the front end of the operating rod being turned laterally to provide a handle 74. By grasping the handle 74 and pulling the rod 70, the slideway or track 57 may be swung to bring its forward end into the compartment 10, in which position it is shown in Fig. 4. When the rod is pushed inwardly to return the slideway or track to its normal position, the track is arrested in such position by the engagement of a stop 75, provided by a rearward extension of the lug 72, with the vertical flange of the rear member of the base frame 3.

The combustion device or burner unit may be and preferably is the same as that disclosed in Patent No. 2,092,205, granted September 7, 1937 on a joint invention of Wilbur G. Midnight and myself, and it comprises, generally, a shallow elongated hollow body or oil container 80, incorporating three burners 81, preferably of the so-called wickless type, which are surmounted by removable drums 82 that enclose and have attached to them the usual commingling tubes, the tops of the inner ones of which are shown at 83. Oil is supplied to the burner body or container 80 through a short conduit 85 from a dispensing receptacle 86 that is rigidly secured to and supported by said conduit. An oil reservoir 88, desirably in the nature of a metal bottle, is adapted to be supported in inverted position by the receptacle 86 with its discharge mouth located within and adjacent the bottom of the latter, such mouth being equipped with a self-closing valve that is automatically opened when the reservoir is positioned as described, all of which is in accordance with well known practice, and as clearly disclosed in the last mentioned patent. The discharge opening or mouth of the reservoir is adapted to be liquid sealed within the receptacle 86 and its elevation determines the oil level in the body or container 80.

Incidentally, the reservoir 88 is of a capacity to accommodate just enough fuel to sustain a heating phase or period of a cycle of operation of the machine of maximum duration. Under certain circumstances, however, the maximum length heating phase may not be required, when less than a full charge of fuel may be placed in the reservoir. In any event, the amount of oil required by the circumstances is placed within the reservoir and the reservoir is inverted over and supported by and in operative relation to the receptacle 86. Now, when the burners are lighted, they will generate heat for the length of time required to produce sufficient refrigeration to hold over through a predetermined interval of time to the next heating period. The reservoir 88 is protected from the intense heat of the burners by a double wall shield 89 that is shown as supported between the reservoir and adjacent burner by brackets 90 that are secured to the receptacle 86.

A handle 91 on the receptacle 86 provides means for conveniently shifting the burner unit along the slideway or track 57. As shown especially well in Fig. 4, the combustion device or burner unit includes rails 92, suitably fastened in parallel relation to each other to the opposite sides of the burner body or container 80, and said rails are slidable in the channel members of the slideway or track 57. The rear ends of the rails 92 are provided with stops 93, arranged to engage abutments 94 that depend from the upper flanges of the channels adjacent the free end of the slideway or track. By lifting the front end of the combustion device or burner unit, when in its extended or forward position, the stops 93 may be made to escape or pass under the abutments 94, thereby permitting the combustion device or burner unit to be removed bodily from the slideway or track, this feature being clearly brought out in the last mentioned patent.

It is clear from what has been said that when it is desired to light the burners the door 11 is opened which, by reason of the connection of said door, through rod 32, with the partition or shield 29, will cause the latter to be swung upwardly to inoperative position adjacent the bottom wall 43 of the refrigeration space 2. The handle 74 may now be grasped and the rod 70 pulled forwardly to swing the slideway or track 57 into the compartment 10, and the operator may then conveniently reach the handle 91 and pull the combustion device or burner unit 60 forwardly to the position shown in Fig. 4. Assuming that the fuel supply has been exhausted by the previous operation, the reservoir 88 is removed from the receptacle 86, filled, and replaced; or a previously filled reservoir is substituted for the empty one. The operator next lifts or tilts the drums 82 in the usual way and lights the burners 81 and returns the drums to normal position, after which the burner unit is shoved inwardly as far as it will go and the slideway or track 57 is swung to normal position by means of the operating rod 70 to dispose the burner unit within the bottom of the flue 24 beneath the generator 40. The door 11 is now closed which automatically returns the partition or shield 29 to vertical, operative position. The presence of the partition or shield in this position protects the bottom wall 43 of the refrigeration space from the intense heat of the burner unit; and the insulation of the said space from such heat is further enhanced by the double front wall of the flue 24 and the spacing of said wall from the rear wall 22 of the refrigeration space. As will be remembered, the insulating effect of the partition or shield and said flue wall is further increased by the circulation of air therethrough. In precisely the same way the condenser tank is shielded from the heat of the products of combustion rising through the flue 24.

Having thus described my invention, what I claim is:

1. An absorption refrigerating machine comprising a cabinet enclosing, with the refrigerating system, an insulated refrigeration space and a compartment that is open at one side, a flue rising alongside the refrigeration space, a combustion device for heating the generator of the refrigerating system and arranged to discharge its products into said flue, said device being accessible through the compartment, a door for the open side of the compartment, a movably supported shield normally reposing between the combustion device and said compartment, and operative connections between the door and shield whereby the latter is shifted to afford access to the combustion device when said door is opened.

2. An absorption refrigerating machine comprising a cabinet enclosing, with the refrigerating system, an insulated refrigeration space, a compartment therebelow, and a flue that rises through the cabinet to one side of said space, the compartment opening through the side of the cabinet remote from the flue, a combustion device for heating the generator of the refrigerating system, a movable support therefor permitting the device to be shifted between an operative position wherein it discharges its products into said flue and a second position within the compartment, the combustion device being shiftable on the support whereby the device may be disposed adjacent the open side of the compartment, a door for said open side of the compartment, and a movably supported shield normally reposing between the compartment and the combustion device when the latter is in operative position, and operative connections between the door and shield whereby the shield is moved out of the way when the door is opened to permit shifting of the combustion device from operative position to a position within the compartment.

3. An absorption refrigerating machine comprising a cabinet enclosing, with the refrigerating system, an insulated refrigeration space, a compartment therebelow that opens through the front of the cabinet, and a flue rising to the rear of the refrigeration space, the flue merging at its lower end with the rear of the compartment, a shield hingedly supported adjacent its upper edge within the cabinet and normally reposing in a position to separate the compartment from the flue, a combustion device for heating the generator of the refrigerating system, a slideway for said device movably supported in the bottom of the cabinet and adapted to be shifted between a position within the bottom of the flue and a second position wherein it disposes the device within the compartment.

4. An absorption refrigerating machine comprising a cabinet enclosing, with the refrigerating system, an insulated refrigeration space, a compartment therebelow that opens through the front of the cabinet, and a flue rising to the rear of the refrigeration space, the flue merging at its lower end with the rear of the compartment, a shield hingedly supported adjacent its upper edge within the cabinet and normally reposing in a position to separate the compartment from the flue, a door for the open front of the compartment, operative connections between the door and said shield whereby when the door is opened said shield will be swung to a position adjacent the top of the compartment thereby to give access to the flue through the compartment, a combustion device for heating the generator of the refrigerating system, a support for said device, said support being pivoted to the cabinet adjacent one of its ends, the support being adapted to be swung about its pivot between a position within the bottom of the flue and a second position within the compartment.

5. An absorption refrigerating machine comprising a cabinet enclosing, with the refrigerating system, an insulated refrigeration space, a compartment therebelow that opens through the front of the cabinet, and a flue rising to the rear of the refrigeration space, the flue merging at its lower end with the rear of the compartment, a combustion device for heating the generator of the refrigerating system, a support for said device, said support being pivoted adjacent one of its ends to the cabinet, the support being adapted to be swung about its pivot between a position within the bottom of the flue and a second position within the compartment, and means adjacent the open front of the compartment for swinging the support.

6. An absorption refrigerating machine comprising a cabinet enclosing, with the refrigerating system, an insulated refrigeration space, a compartment therebelow that opens through the front of the cabinet, and a flue rising to the rear of the refrigeration space, the flue merging at its lower end with the rear of the compartment, a shield hingedly supported adjacent its upper edge within the cabinet and normally reposing in a position to separate the compartment from the flue, a door for the open front of the compartment, operative connections between the door and said shield whereby when the door is opened said shield will be swung to a position adjacent the top of the compartment thereby to give access to the flue through the compartment, a combustion device for heating the generator of the refrigerating system, a support for said device, said support being pivoted adjacent one of its ends to the cabinet, the support being adapted to be swung about its pivot between a position within the bottom of the flue and a second position within the compartment, and means accessible when the compartment door is open for swinging the support.

7. An absorption refrigerating machine comprising a cabinet enclosing, with the refrigerating system, an insulated refrigeration space, a compartment therebelow, said system including a condenser tank spaced rearwardly of the refrigeration space and a substantial distance above the bottom of the cabinet, and a flue rising through the cabinet between the refrigeration space and condenser tank and enlarged adjacent its lower end where it merges with the rear of said compartment, the compartment being open at the front, the generator-absorber of the refrigerating system being disposed within the lower portion of the flue, the receiver-evaporator adjacent the top of the refrigeration space and the condenser element within the aforesaid tank, a combustion device supported for movement between an operative position beneath the generator-absorber and a lighting position within the said compartment, and a movably supported shield for normally separating the compartment from the bottom of the flue.

8. An absorption refrigerating machine comprising a cabinet enclosing, with the refrigerating system, an insulated refrigeration space, an open front compartment therebelow, said system including a condenser tank spaced rearwardly of the refrigeration space and a substantial distance above the bottom of the cabinet, and a flue rising through the cabinet between the refrigeration space and condenser tank and certain walls whereof are double to provide air circulating ducts, the flue being enlarged adjacent its lower end where it merges with the rear of said compartment, the generator-absorber of the refrigerating system being disposed within the lower portion of the flue, the receiver-evaporator adjacent the top of the refrigeration space and the condenser element within the aforesaid tank, a combustion device supported for movement between an operative position beneath the generator-absorber and a lighting position within the said compartment, and a movably supported double wall shield for normally separating the compartment from the bottom of the flue, the double wall of the shield providing an air circulating space that is vented into the flue.

9. An absorption refrigerating machine comprising a cabinet enclosing, with the refrigerating system, an insulated refrigeration space, a compartment that is open at one side, and a flue rising from said compartment, an arcuate rail in the bottom of the compartment, a support for a combustion device pivotally connected adjacent one of its ends to the cabinet, the pivotal axis of said support being vertical and substantially concentric with respect to said rail, the free end of the support being sustained by the rail, means for swinging the support between a position adjacent the flue and a second position toward the open side of the compartment, and a combustion device carried by the support, the generator of the refrigerating system being situated within the flue.

10. An absorption refrigerating machine comprising a cabinet enclosing, with the refrigerating system, an insulated refrigeration space, a compartment therebelow that is open at one side, and a flue rising alongside the refrigeration space and merging adjacent its lower end with said compartment, an arcuate rail sustained in a horizontal position within the base of the cabinet in substantially the plane of the bottom of the compartment, a slideway pivotally connected adjacent one of its ends to the cabinet, the pivotal axis of the slideway being vertical and substantially concentric with respect to said rail, an anti-friction bearing through which the free end of the slideway is supported from said rail, means available through the open side of the compartment for swinging the slideway between a position adjacent the flue and a second position within the compartment, and a burner unit reciprocably supported by the slideway, the generator of the refrigerating system being situated within the flue.

11. An absorption refrigerating machine comprising a cabinet enclosing, with the refrigerating system, an insulated refrigeration space, a compartment therebelow that is open at one side, and a flue rising to the rear of the refrigeration space and merging at its lower end with said compartment, a slideway pivotally connected adjacent one of its ends to a rear corner of the base portion of the cabinet in about the plane of the bottom of the compartment, the axis of said pivotal connection being vertical, an arcuate rail substantially concentric to said axis arranged horizontally within the base portion of the cabinet and whereby the free end of the slideway is movably sustained, an actuating member connected at its rear end to said slideway and having its forward end disposed adjacent the open side of the compartment and by means of which the slideway may be swung on its pivot, and a burner unit reciprocably supported by the slideway, the generator of the system being in the flue.

12. An absorption refrigerating machine comprising a cabinet enclosing, with the refrigerating system, an insulated refrigeration space, a compartment therebelow that is open at one side, and a flue rising to the rear of the refrigeration space and merging at its lower end with said compartment, a slideway pivotally connected adjacent one of its ends to a rear corner of the base portion of the cabinet in about the plane of the bottom of the compartment, the axis of said pivotal connection being vertical, an arcuate track substantially concentric to said axis arranged horizontally within the base portion of the cabinet and whereby the free end of the slideway is movably sustained, an actuating member connected at its rear end to said slideway and by means of which the slideway may be swung on its pivot, a guide sustaining the forward end of the actuating member adjacent the open side of the compartment, a door for the open side of the compartment that is prevented from closing by said member when the member and slideway are in any but normal position, and a burner unit reciprocably supported by the slideway, the generator of the system being situated in the flue.

13. An absorption refrigerating machine comprising a cabinet enclosing, with the refrigerating system, an insulated refrigeration space, a compartment therebelow that is open at one side, and a flue rising to the rear of the refrigeration space and merging at its lower end with said compartment, a slideway pivotally connected adjacent one of its ends to a rear corner of the base portion of the cabinet in about the plane of the bottom of the compartment, the axis of said pivotal connection being vertical, an arcuate rail substantially concentric to said axis arranged horizontally within the base portion of the cabinet and whereby the free end of the slideway is movably sustained, an actuating member connected at its rear end to said slideway and having its forward end disposed adjacent the open side of the compartment and by means of which the slideway may be swung on its pivot, a burner unit reciprocably supported by the slideway, a shield hingedly supported adjacent its upper end for swinging movement between a substantially vertical position in which it separates the flue from the compartment and a second substantially horizontal position adjacent the top of the compartment, a door for the open side of the compartment hingedly connected to the cabinet, and operative connections between the door and shield whereby the latter will be swung between operative position and the second mentioned position when the door is opened and closed.

14. An absorption refrigerating machine comprising a cabinet enclosing a refrigeration space, a compartment therebelow, a flue rising at the rear of said cabinet and communicating with said compartment at its lower end, a refrigerating system including a generator situated in said flue, a burner unit for heating said generator, and supporting means therefor permitting swinging of said unit about a vertical axis from a position below said generator to a second position within said compartment, and permitting subsequent horizontal shifting of the unit to a third position forwardly of said compartment.

15. An absorption refrigerating machine comprising a cabinet enclosing a refrigeration space, a compartment therebelow, a flue rising at the rear of said cabinet and communicating with said compartment at its lower end, a refrigerating system including a generator situated in said flue, a burner unit for heating said generator, and supporting means therefor permitting swinging of said unit about a vertical axis from a position below said generator to a second position within said compartment, and permitting subsequent horizontal shifting of the unit to a third position forwardly of said compartment, said supporting means including a slideway having a stop to limit the forward movement of the burner unit.

16. An absorption refrigerating machine comprising a cabinet enclosing a refrigeration space, a compartment therebelow, a flue rising at the rear of said cabinet and communicating with said compartment at its lower end, a refrigerating system including a generator situated in said flue, a burner unit for heating said generator, supporting means therefor permitting swinging of said unit about a vertical axis from a position below said generator to a second position within said compartment and permitting subsequent shifting of the unit to a third position wherein it is accessible from in front of the compartment, a door for closing the front of the compartment, a shield positioned in front of said burner unit when said unit is in its first position, and operative connections between said door and said shield whereby when said door is opened said shield is retracted allowing the burner unit to be moved to the second position.

LEE S. CHADWICK.